United States Patent
Lv et al.

(10) Patent No.: US 12,157,804 B2
(45) Date of Patent: Dec. 3, 2024

(54) ENVIRONMENT-FRIENDLY REINFORCED FOAM FOR UNDERGROUND HYDROGEN STORAGE AND PREPARATION METHOD THEREOF

(71) Applicant: CHINA UNIVERSITY OF PETROLEUM—BEIJING, Beijing (CN)

(72) Inventors: Qichao Lv, Beijing (CN); Tongke Zhou, Beijing (CN); Abdolhossein Hemmati-Sarapardeh, Beijing (CN); Zilong Liu, Beijing (CN); Hossein Jalalifar, Beijing (CN); Junjian Li, Beijing (CN); Rong Zheng, Beijing (CN); Longxuan Li, Beijing (CN); Zhaoxia Dong, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 95 days.

(21) Appl. No.: 18/316,483

(22) Filed: May 12, 2023

(65) Prior Publication Data
US 2024/0228720 A1    Jul. 11, 2024

(30) Foreign Application Priority Data
Jan. 6, 2023    (CN) .......................... 202310016820.9

(51) Int. Cl.
B65G 5/00    (2006.01)
C08J 9/12    (2006.01)

(52) U.S. Cl.
CPC ................ C08J 9/122 (2013.01); B65G 5/00 (2013.01); *C08J 2301/02* (2013.01)

(58) Field of Classification Search
CPC ......... C08J 9/122; C08J 2301/02; B65G 5/00; C09K 8/703; C09K 8/80; C09K 8/94; C09K 2208/10; E21B 43/267
See application file for complete search history.

(56) References Cited

U.S. PATENT DOCUMENTS

| 10,266,754 B2 * | 4/2019 | Nguyen | E21B 43/26 |
| 2021/0207021 A1 * | 7/2021 | Khamatnurova | C09K 8/845 |

FOREIGN PATENT DOCUMENTS

| CN | 103194191 A | 7/2013 |
| CN | 109439307 A | 3/2019 |

(Continued)

OTHER PUBLICATIONS

Decision to Grant a Patent issued on Jun. 25, 2024 in corresponding Chinese Application No. 202310016820.9; 3 pages.

(Continued)

*Primary Examiner* — Carib A Oquendo
(74) *Attorney, Agent, or Firm* — Maier & Maier, PLLC

(57) ABSTRACT

Environment-friendly reinforced foam for underground hydrogen storage and a preparation method thereof. The reinforced foam includes hydrogen and a liquid phase, where the liquid phase is an aqueous solution of a foaming agent, a foam stabilizer, a pH regulator and a particle cosolvent; and the foam stabilizer is a compounded system composed of 0-dimensional nanomaterial and 1-dimensional nanomaterial at a mass ratio of 2-5:1. In the reinforced foam of the present disclosure, the 0-dimensional and the 1-dimensional nanomaterials are compounded to form a nano-armor layer, which improves the stability of foam and the interfacial viscoelasticity of a liquid film by synergistic reinforcement, and inhibits the viscous fingering, escape and leakage of hydrogen in a reservoir, thereby not only being (Continued)

beneficial to improving the mobility of hydrogen, but also increasing the safety of hydrogen underground storage.

12 Claims, 2 Drawing Sheets

(56) References Cited

FOREIGN PATENT DOCUMENTS

| WO | 9821772 A1 | 5/1998 |
| WO | 2004090182 A1 | 10/2004 |
| WO | 2015134007 A1 | 9/2015 |
| WO | 2020060529 A1 | 3/2020 |

OTHER PUBLICATIONS

Office Action issued on Jun. 25, 2024, in corresponding Chinese Application No. 202310016820.9, 6 pages.

\* cited by examiner

ENVIRONMENT-FRIENDLY REINFORCED FOAM FOR UNDERGROUND HYDROGEN STORAGE AND PREPARATION METHOD THEREOF

CROSS-REFERENCE TO RELATED APPLICATION

The present application claims priority to Chinese Patent Application No. 202310016820.9, entitled with "ENVIRONMENT-FRIENDLY REINFORCED FOAM FOR UNDERGROUND HYDROGEN STORAGE AND PREPARATION METHOD THEREOF", filed with China National Intellectual Property Administration on Jan. 6, 2023. The disclosure of the aforementioned application is hereby incorporated by reference in its entirety.

TECHNICAL FIELD

The present disclosure relates to an environment-friendly reinforced foam for underground hydrogen storage and a preparation method thereof, and belongs to the technical field of underground hydrogen storage engineering.

BACKGROUND

With the huge consumption of fossil energy and the increasing greenhouse effect, how to reduce the emission of greenhouse gases such as carbon dioxide and alleviate the impact of global warming and environmental pollution has become a key issue to be solved urgently. Hydrogen energy is a carbon-free energy carrier with abundant sources and wide applications, which has the advantages of cleanliness and safety, and can be used as industrial raw materials or power fuels. Although renewable energy such as solar energy, wind energy, geothermal energy and tidal energy is clean and pollution-free and a large number of projects have been built and put into use in the power grid, the energy supply capacity fluctuates greatly and it is difficult to achieve the sustainable supply of energy. Therefore, hydrogen energy as an intermediate energy storage technology is an effective way to solve the sustainable supply of energy. The electric energy in the trough period of power consumption can be used for electrolyzing water to generate hydrogen, which will be stored and then extracted for power generation during the peak period of power consumption, thereby realizing the efficient allocation of large-scale renewable energy across regions and industries and improving the flexibility of the energy system. In addition, the combustion product of hydrogen is water, which is clean and free of carbon dioxide emissions, so hydrogen is an ideal alternative energy gas for carbon-containing fuels such as natural gas. Therefore, the application of hydrogen energy will reduce the reliance on fossil energy such as oil and gas, and contribute to reducing carbon emissions in various walks of life.

The efficient and safe storage of hydrogen energy is the key to its effective utilization, and underground hydrogen storage technology has attracted much attention due to its large scale and low cost. The large-scale promotion of underground storage technology for natural gas, carbon dioxide and other gases provides mature experience for underground storage of hydrogen. Hydrogen is mainly stored in abandoned oil and gas reservoirs, salt caverns, deep aquifers, etc. Among them, deep aquifers are widely distributed, with large thickness and area of formation, and have a huge potential for hydrogen storage. However, due to its characteristics of the small molecular weight, low density, low viscosity and low solubility in water, hydrogen shows higher mobility when flowing in the porous media of formation, and thus the viscous fingering phenomenon occurs. Therefore, when hydrogen is injected into the underground for storage, the storage capacity of hydrogen will be greatly reduced and the storage cost will be greatly increased without controlling the mobility of hydrogen. In addition, hydrogen has a stronger diffusion ability and is more prone to leak towards the top or side of formation, which leads to a great technical challenge to the security of sequestration.

Foam is a kind of gas-liquid two-phase fluid, where gas is wrapped in bubbles. Jamin effect and wall slipping resistance of foam inhibit the channeling of gas in porous media, which can enlarge the sweep volume, so it is widely used in gas mobility control. However, foam is a thermodynamically unstable system, and the behaviors such as liquid drainage, bubble coarsening and coalescence will aggravate the rupture of foam. Therefore, many synthetic surfactants and macromolecular chemicals (such as polymers) are used for enhancing the stability of foam, increasing the viscosity of foam fluid, and enhancing gas mobility control performance. Although this method has achieved relative success in improving the effect of gas storage, these chemicals often pollute the environment and formation, causing serious environmental problems. On the one hand, once toxic or polluting substances invade the water source, they will consume dissolved oxygen in the water or directly produce toxic damage and thus cause a fatal blow to aquatic organisms. This part of water resource will not be used for agricultural irrigation or residential lives. On the other hand, macromolecular chemicals that are difficult to be degraded by microorganisms are easy to block pores and throats in formation after entering the formation. Additionally, they are difficult to be effectively removed, causing irreversible damage to the permeability of the reservoir. Therefore, it is of great significance to explore environmentally friendly underground hydrogen storage methods for efficient and safe storage of hydrogen energy.

SUMMARY

The present disclosure aims to provide an environment-friendly reinforced foam for underground $H_2$ storage, where 0-dimensional nanomaterial and 1-dimensional nanomaterial are compounded to form a nano-armor layer, so that the stability of the foam and the interfacial viscoelasticity of a liquid film are synergistically reinforced and improved, the viscous fingering, escape and leakage of hydrogen in a reservoir are inhibited, thereby improving the hydrogen storage efficiency and storage safety. The reinforced foam of the present disclosure has the characteristics of environmental protection, strong stability, ultra-low reservoir damage, strong mobility-control, strong hydrogen-entrapment ability and the like, which is beneficial to the environment-friendly, safe and large-scale underground storage of hydrogen.

The 0-dimensional nanomaterial involved in the present disclosure refers to a nanomaterial with three dimensions in nanometer size, such as nanoparticles.

The 1-dimensional nanomaterial involved in the present disclosure refers to a nanomaterial with two dimensions in nanometer size, such as nanocellulose and nanowires.

The environment-friendly reinforced foam for underground $H_2$ storage provided by the present disclosure includes a gas phase and a liquid phase, where
  the gas phase is hydrogen;
  the liquid phase is an aqueous solution of a foaming agent, a foam stabilizer, a pH regulator and a particle cosolvent;
  the foam stabilizer is a compounded system of 0-dimensional nanomaterial and 1-dimensional nanomaterial;
  a mass ratio of the 0-dimensional nanomaterial to the 1-dimensional nanomaterial is 2-5:1;
  a foam quality of the reinforced foam is 50-90%, preferably 60%-85%, where the foam quality refers to a percentage of the volume of gas in the foam to the total volume of the foam.

In the above mentioned reinforced foam, the liquid phase includes the following components in percentage by mass:
  0.1-0.6% of the foaming agent;
  0.5-2.5% of the foam stabilizer;
  0.015-0.065% of the pH regulator;
  0.5-2% of the particle cosolvent;
  water in balance.

Preferably, in the liquid phase, a mass percentage of the foaming agent is 0.3-0.5%, and a mass percentage of the foam stabilizer is 0.5-1.0%.

In the above reinforced foam, the foaming agent is selected from one or more of *Camellia oleifera* saponin, alkyl glycoside (the polymerization degree n ranges from 1.1 to 3 and the number of alkyl groups ranges from 8 to 16), rhamnolipid, sophorolipid and trehalose lipid, which has wide sources and mature extraction and preparation processes, can be degraded by microorganisms, and has no bio-toxicity or chemical residue, thereby bringing no damage to environment and reservoir and being environment-friendly and pollution-free.

In the above reinforced foam, the mass ratio of the 0-dimensional nanomaterial to the 1-dimensional nanomaterial is controlled to be 2-5:1. Under this ratio, the 0-dimensional nanomaterial and the 1-dimensional nanomaterial can generate a good compounding and reinforcing effects to form a compact nano-armor layer, thereby synergistically reinforcing the foam, so that the foam skeleton is stable and the liquid film is compact, $H_2$ diffusion and liquid drainage are inhibited, the coalescence between bubbles and the break speed of the liquid membrane are slowed, and the foam stability and mobility-control ability are stronger. Under the concentration ratio, the foaming agent and the foam stabilizer have a good synergistic effect, and the nano-armor layer is tightly adsorbed on a gas-liquid interface to stabilize foam under the driving of the foaming agent, thereby improving the viscoelasticity of the liquid film.

In the above reinforced foam, the 0-dimensional nanomaterial is a hydrophobic nanoparticle or a hydrophilic nanoparticle;
  a wetting angle of a surface of the hydrophobic nanoparticle to water is 102° to 137°,
  a wetting angle of a surface of the hydrophilic nanoparticle to water is 32° to 71°,
  under any one of the above two wetting angles, the nanoparticle can form a strong synergistic effect with the foaming agent and the 1-dimensional nanomaterial, thereby facilitating to form a compact nano-armor layer;
  a particle size of the 0-dimensional nanomaterial is 5-60 nm.

Preferably, the 0-dimensional nanomaterial is selected from one or more of $SiO_2$ nanoparticles, $Al_2O_3$ nanoparticles, $Fe_3O_4$ nanoparticles, ZrO nanoparticles and $TiO_2$ nanoparticles.

In the above reinforced foam, the 1-dimensional nanomaterial is selected from one or two of nanocellulose and nano-chitin.

The nanocellulose is selected from one or more of cellulose nanocrystals, cellulose nanofibers, and bacterial nanocellulose; and is extracted from natural source materials such as wood, cotton and bacteria. The nanocellulose has a wide source, can be degraded by microorganisms, is free of bio-toxicity or chemical residue, cannot damage the environment and a reservoir, and is environment-friendly and pollution-free.

In the above reinforced foam, the pH regulator is sodium carbonate, sodium bicarbonate or potassium carbonate.

The particle cosolvent is ethanol, ethylene glycol or isopropanol, and is mainly used for assisting the 0-dimensional nanomaterial to be uniformly and stably dispersed in the liquid phase during preparation of the foam so as to improve the forming effect of the nano-armor layer.

The present disclosure provides a preparation method of the reinforced foam, including the following method A or method B.

Method A for laboratory evaluation of foam properties (foamability and stability):
  adding the 1-dimensional nanomaterial into water and stirring, adding the foaming agent, and continuously stirring; then adding the 0-dimensional nanomaterial, the pH regulator and the particle cosolvent, and stirring to obtain a foam base solution;
  pouring the foam base solution into a container, sealing the container, and introducing hydrogen to form a hydrogen environment in the container;
  stirring the foam base solution by a Waring Blender method to foam.

Method B for $H_2$ underground storage site construction:
  adding the 1-dimensional nanomaterial and the foaming agent into water and stirring, adding the 0-dimensional nanomaterial, the pH regulator and the particle cosolvent, and stirring to obtain a foam base solution;
  injecting the foam base solution and hydrogen into a foam generator for mixing and foaming to obtain hydrogen foam with a foam quality required by operation, and directly injecting the hydrogen foam into the formation through a wellhead via a high-pressure pipeline for underground $H_2$ storage, where the specific gas-liquid ratio and injection speed can be controlled according to the construction requirements.

The present disclosure has the following beneficial technical effects:

(1) In the environment-friendly reinforced foam of the present disclosure, the 0-dimensional nanoparticles and the 1-dimensional nanocellulose are compounded to form a compact nano-armor layer to synergistically reinforce the foam. The skeleton of the foam is stable, and the liquid film is compact. Therefore, hydrogen diffusion and foam rupture can be effectively inhibited, and the compact nano-armor layer is an efficient carrier for hydrogen to enter an underground reservoir.

(2) In the environment-friendly reinforced foam of the present disclosure, the nano-armor layer has strong interfacial viscoelasticity. The high flow resistance can be generated under the strong Jamin effect and the wall slipping effect during the flowing of the foam. Therefore, a high seepage flow channel in the porous media is effectively blocked, the mobility of hydrogen is improved, the viscous fingering of hydrogen in the porous media is inhibited, the hydrogen storage volume is expanded, and the hydrogen storage capacity is enhanced.

(3) The environment-friendly reinforced foam of the present disclosure has strong interfacial viscoelasticity and stable foam. Therefore, the escape and leakage of hydrogen in the porous media can be effectively inhibited, the long-acting storage of hydrogen can be realized, and the safety of hydrogen underground storage is greatly improved.

(4) The environment-friendly reinforced foam of the present disclosure adopts original components in natural organisms as a foaming agent and a foam stabilizer. Such original components belong to environment-friendly sustainable materials, have wide source, can be degraded by microorganisms and cannot cause pollution and damage to environment and the permeability of reservoirs.

(5) The environment-friendly reinforced foam of the present disclosure is beneficial to hydrogen underground storage, and can also change waste into valuables. The utilization value of the agricultural wastes can be improved by utilizing the surfactant and cellulose extracted from the agricultural wastes. Therefore, the secondary utilization of agricultural fertilizers can be realized and the cost of large-scale underground hydrogen storage can be reduced.

DETAILED DESCRIPTION OF EMBODIMENTS

Figure 1:
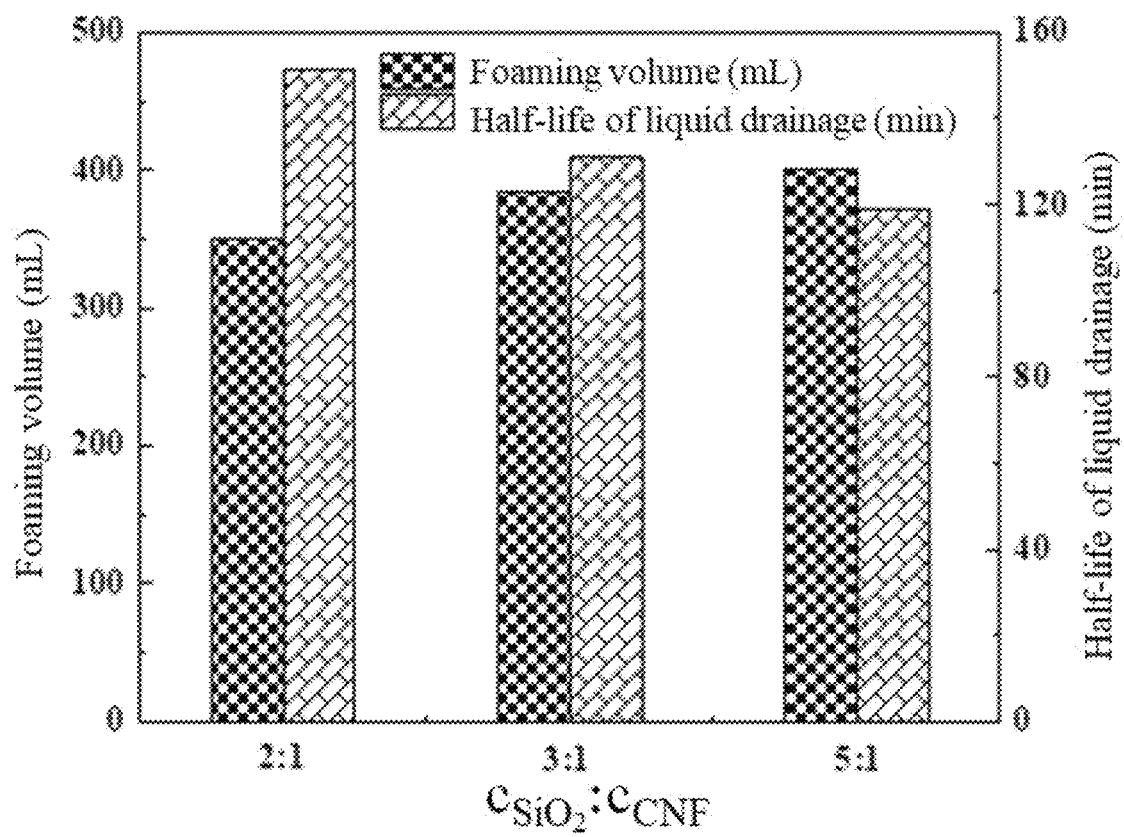
FIG. 1 shows the foam volume and half-life of liquid drainage of the foams containing different mass ratios of 0-dimensional nanomaterials and 1-dimensional nanomaterials prepared in Examples 1, 4 and 5 of the present disclosure.

The experimental methods used in the following examples are conventional unless otherwise specified.

Materials, reagents and the like used in the following examples are commercially available unless otherwise specified.

Example 1 Preparation of an Environment-Friendly Reinforced Foam for Underground $H_2$ Storage The environment-friendly reinforced foam for underground $H_2$ storage prepared in this Example includes a gas phase and a liquid phase, where the gas phase is hydrogen, and the liquid phase includes the following components in percentage by mass: 0.3 wt. % (weight percent) of foaming agent, 0.5 wt. % of foam stabilizer, 0.025 wt. % of pH regulator, 1.5 wt. % of particle cosolvent and water in balance.

The foaming agent is a compounded system composed of *Camellia oleifera* saponin, and rhamnolipid at a mass ratio of 5:1, and the rhamnolipid has a structural-expression general formula of $Rha-C_{10}-C_{10}$;

the foam stabilizer is a compounded system composed of $SiO_2$ nanoparticles (having a wetting angle to water of 137°, and an average particle size of about 10 nm) and cellulose nanofibers (having an average diameter of about 50 nm, and the length of 1-3 μm) at a mass ratio of 3:1;

the pH regulator is sodium bicarbonate;

the particle cosolvent is ethanol.

The preparation method included the following steps:

adding the cellulose nanofibers into water according to the proportion, stirring with a magnetic stirrer for 35 min, then adding the foaming agent, stirring for 15 min, and finally adding the $SiO_2$ nanoparticles, sodium bicarbonate and ethanol, and stirring for 50 min to obtain 100 mL of foam base solution; pouring the foam base liquid into a stirring cup, then sealing the stirring cup, and introducing hydrogen to form a hydrogen environment in the cup; stirring 100 mL of the foam base solution by using Waring Blender method to foam with a stirring speed of 8000 r/min for 3 min, thereby obtaining the environment-friendly reinforced foam.

Immediately after stirring, the foam was poured into a 1000 mL measuring cylinder, and the initial volume of the foam was recorded to be 385 mL and the time for 50 mL of liquid to separate out of the foam was 130.8 min at normal temperature and normal pressure. The foaming ability and stability were good.

Comparative Example 1

The foam of Comparative Example 1 was prepared according to the mass ratio and method of Example 1, except that the 0-dimensional nanomaterial was not added.

Comparative Example 2

The foam of Comparative Example 2 was prepared according to the mass ratio and method of Example 1, except that the 1-dimensional nanomaterial was not added.

Comparative Example 3

The foam of Comparative Example 3 was prepared according to the mass ratio and method of Example 1, except that no foam stabilizer was added.

The foams prepared in Example 1 and Comparative Examples 1, 2 and 3 were compared, and the experimental data was shown in Table 1.

TABLE 1

Comparison of parameters between the reinforced foam, the foam with only surfactant, and the foam added with single foam stabilizer

| No. | Foaming agent (wt. %) | 0-dimensional nanomaterial (wt. %) | 1-dimensional nanomaterial (wt. %) | Foaming volume (mL) | Half-life of liquid drainage of foam (min) |
|---|---|---|---|---|---|
| Example 1 | 0.3 | 0.375 | 0.125 | 385 | 130.8 |
| Comparative Example 1 | 0.3 | 0 | 0.5 | 390 | 78.4 |

TABLE 1-continued

Comparison of parameters between the reinforced foam, the foam with only surfactant, and the foam added with single foam stabilizer

| No. | Foaming agent (wt. %) | 0-dimensional nanomaterial (wt. %) | 1-dimensional nanomaterial (wt. %) | Foaming volume (mL) | Half-life of liquid drainage of foam (min) |
|---|---|---|---|---|---|
| Comparative Example 2 | 0.3 | 0.5 | 0 | 405 | 27.4 |
| Comparative Example 3 | 0.3 | 0 | 0 | 435 | 5.5 |

It can be seen from the data in Table 1 that the reinforced $H_2$ foam prepared by adding the compounded foam stabilizer containing the 0-dimensional and 1-dimensional nanomaterials was more stable than the foam formed by adding only surfactant and the foam formed by adding a single foam stabilizer, and had a foaming volume that was maintained in a stable range, and a good foaming capacity. After the foam was injected into the formation, the foam was subjected to a dynamic rupture and regeneration as it passed through pores and throats; and the dynamic stability of the foam is attributed to its good foaming capacity, which improves the ability of the foam to control gas mobility and expand the storage range of $H_2$.

Example 2 Preparation of an Environment-Friendly Reinforced Foam for Underground $H_2$ Storage The foam was prepared according to the mass ratio and method of Example 1, except that the foaming agent was a compounded system composed of *Camellia oleifera* saponin, and alkyl glycoside at a mass ratio of 5:1, and the alkyl number of the alkyl glycoside was 12 to 14.

At normal temperature and pressure, the initial volume of foam was recorded to be 370 mL and the time for 50 mL of liquid to separate out of the foam was 135.6 min. The foaming ability and foaming stability were good.

Example 3 Preparation of an Environment-Friendly Reinforced Foam for Underground $H_2$ Storage The foam was prepared according to the mass ratio and method of Example 1, except that the foam stabilizer was a compounded system composed of $SiO_2$ nanoparticles and cellulose nanocrystals at a mass ratio of 3:1.

At normal temperature and pressure, the initial volume of foam was recorded to be 390 mL and the time for 50 mL of liquid to separate out of the foam was 122.1 min. The foaming ability and foaming stability were good.

The parameters and properties of the reinforced foams prepared in Examples 1-3 were shown in Table 2.

TABLE 2

Comparison of parameters of reinforced foams added with different foaming agents and foam stabilizers

| No. | Type and proportion of foaming agent | Foaming agent (wt. %) | Type and proportion of foam stabilizer | Foam stabilizer (wt. %) | Foaming volume (mL) | Half-life of liquid drainage of the foam (min) |
|---|---|---|---|---|---|---|
| Example 1 | Camellia oleifera saponin:rhamnolipid = 5:1 | 0.3 | $SiO_2$:CNF = 3:1 | 0.5 | 385 | 130.8 |
| Example 2 | Camellia oleifera saponin:alkyl glycoside = 5:1 | 0.3 | $SiO_2$:CNF = 3:1 | 0.5 | 370 | 135.6 |
| Example 3 | Camellia oleifera saponin:rhamnolipid = 5:1 | 0.3 | $SiO_2$:CNC = 3:1 | 0.5 | 390 | 122.1 |

Note: CNF represents cellulose nanofibers and CNC represents cellulose nanocrystals.

It can be seen from the data in Table 2 that the reinforced $H_2$ foam prepared by adding alkyl glycoside and cellulose nanofibers had stronger foam stability than that formed by adding rhamnolipid and cellulose nanocrystals, but the difference was not significant, and both of them had good foaming and foam stabilizing effects.

Example 4 Preparation of an Environment-Friendly Reinforced Foam for Underground $H_2$ Storage The foam was prepared according to the mass ratio and method of Example 1, except that the foam stabilizer was a compounded system composed of $SiO_2$ nanoparticles and cellulose nanofibers at a mass ratio of 2:1.

At normal temperature and pressure, the initial volume of the foam was recorded to be 350 mL and the time for 50 mL of liquid to separate out of the foam was 151.5 min. The foaming property and foam stability were good.

Example 5 Preparation of an Environment-Friendly Reinforced Foam for Underground $H_2$ Storage The foam was prepared according to the mass ratio and method of Example 1, except that the foam stabilizer is a compounded system composed of $SiO_2$ nanoparticles and cellulose nanofibers at a mass ratio of 5:1.

At normal temperature and pressure, the initial volume of the foam was recorded to be 400 mL and the time for 50 mL of liquid to be separated out of the foam was 119.1 min. The foaming property and foam stability were good.

As shown in FIG. 1, in combination with Examples 1, 4 and 5, as the proportion of the 1-dimensional nanomaterial in the foam stabilizer increased, the foaming volume decreased, the foam ability decreased slightly, and the half-life of liquid drainage was prolonged, which indicated that the foam stability was enhanced.

Example 6 Preparation of an Environment-Friendly Reinforced Foam for Underground $H_2$ Storage The foam was prepared according to the mass ratio and method of Example 1, except that the foam stabilizer is a compounded system composed of $Al_2O_3$ nanoparticles (having a wetting angle to water of 71°, and an average particle size of about 15 nm) and cellulose nanofibers at a mass ratio of 3:1.

At normal temperature and pressure, the initial volume of the foam was recorded to be 410 mL and the time for 50 mL of liquid to be separated out of the foam was 120.3 min. The foaming property and foam stability were good.

Figure 2:
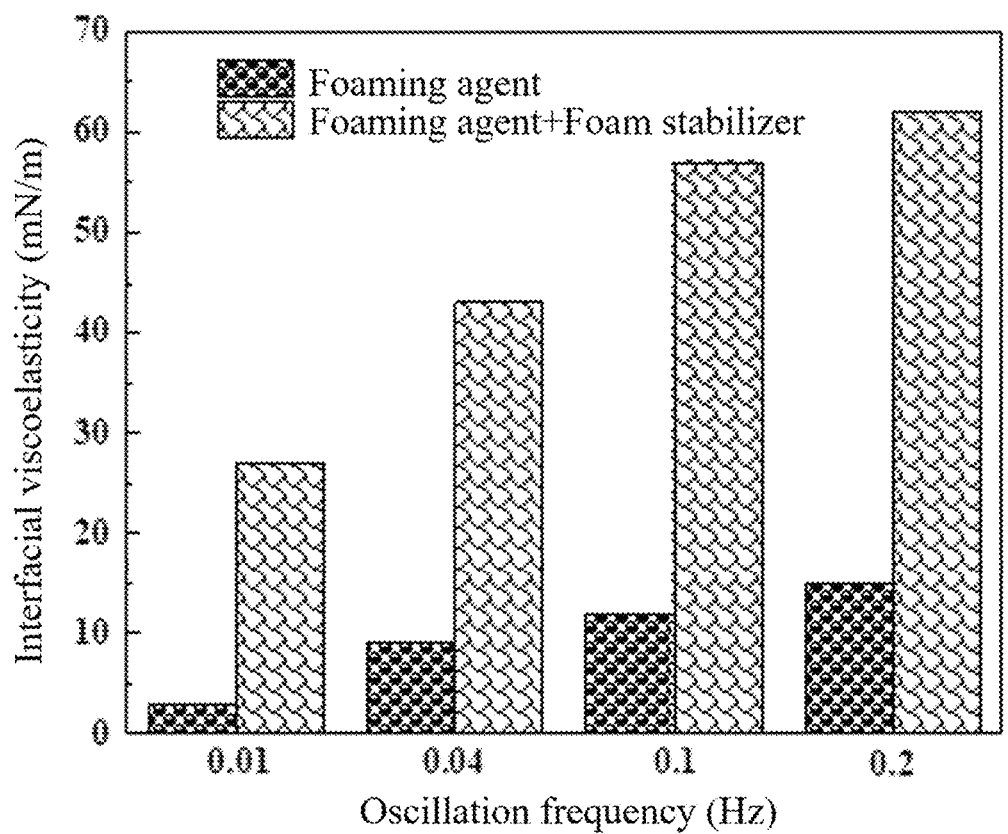
FIG. 2 shows the interfacial viscoelasticity of the foam measured in Example 7 of the present disclosure at different oscillation frequencies.

Example 7 Preparation of an Environment-Friendly Reinforced Foam for Underground $H_2$ Storage The foam base solution was prepared according to the mass ratio and method of Example 1, and poured into a sample pool of an interface rheometer. An injector was filed with $H_2$ and clamped to a stepping motor of the interface rheometer; and the injector was propelled by a computer-controlled stepping motor to form bubbles which were subjected to sinusoidal contraction and expansion oscillation, obtaining interfacial viscoelasticity data. Where, the initial bubble volume was 5 μL, the oscillation amplitude was set to 10% of the initial bubble volume, and the oscillation frequency was 0.01-0.2 Hz. In addition, a pure surfactant system without any foam stabilizer was set as a comparative experiment. As shown in FIG. 2, the interfacial viscoelasticity was greatly improved after adding the nanomaterials.

Example 8 Preparation of an Environment-Friendly Reinforced Foam for Underground $H_2$ Storage The environment-friendly reinforced foam for underground $H_2$ storage prepared in this Example included a gas phase and a liquid phase, where the gas phase was hydrogen, and the liquid phase included the following components in percentage by mass: 0.5 wt. % of foaming agent, 1.0 wt. % of foam stabilizer, 0.025 wt. % of pH regulator, 1.5 wt. % of particle cosolvent and water in balance.

Where, the foaming agent is a compounded system composed of *Camellia oleifera* saponin and rhamnolipid at a mass ratio of 6:1.

The foam stabilizer is a compounded system composed of $SiO_2$ nanoparticles (having a wetting angle to water of 137°, and an average particle size of about 10 nm) and cellulose nanofibers at a mass ratio of 3:1.

The pH regulator is sodium bicarbonate.
The particle cosolvent is ethanol.
The preparation method of the foam ground for the on-site construction of $H_2$ underground storage was as follows:
the cellulose nanofibers and the foaming agent were added into the water according to the above proportion and stirred for 8 min, and then the $SiO_2$ nanoparticles, sodium bicarbonate and ethanol were added and stirred for 10 min to obtain a foam base solution; the foam base solution was pumped into a foam generator and mixed with the gas phase for foaming to obtain foam, and the foam was directly injected into the formation through a wellhead via a high-pressure pipeline for underground $H_2$ storage.

The reinforced foam prepared in this Example had a foam quality of 85%.

What is claimed is:

1. An environment-friendly reinforced foam system for underground $H_2$ storage, comprising a gas phase and a liquid phase, wherein the gas phase is hydrogen;
   the liquid phase is an aqueous solution of a foaming agent, a foam stabilizer, a pH regulator and a particle cosolvent;
   the foam stabilizer is a compounded system of 0-dimensional nanomaterial and 1-dimensional nanomaterial;
   a mass ratio of the 0-dimensional nanomaterial to the 1-dimensional nanomaterial is 2-5:1; and
   a foam quality of the reinforced foam system is 50-90%;
   the 0-dimensional nanomaterial is a compounded system of one or more of $SiO_2$ nanoparticles, $Al_2O_3$ nanoparticles, $Fe_3O_4$ nanoparticles, $ZrO_2$ nanoparticles or $TiO_2$ nanoparticles; and
   the 1-dimensional nanomaterial is a compounded system of one or more of nanocellulose or nano-chitin.

2. The reinforced foam system according to claim 1, wherein the liquid phase comprises the following components in percentage by mass:
   0.1-0.6% of the foaming agent;
   0.5-2.5% of the foam stabilizer;
   0.015-0.065% of the pH regulator;
   0.5-2% of the particle cosolvent; and
   water in balance.

3. The reinforced foam system according to claim 2, wherein the foaming agent is a compounded system of one or more of *Camellia oleifera* saponin, alkyl glycoside, rhamnolipid, sophorolipid or trehalose lipid.

4. The reinforced foam system according to claim 3, wherein the 0-dimensional nanomaterial is a hydrophobic nanoparticle or a hydrophilic nanoparticle;
   a wetting angle of a surface of the hydrophobic nanoparticle to water is 102° to 137°;
   a wetting angle of a surface of the hydrophilic nanoparticle to water is 32° to 71°; and
   a particle size of the 0-dimensional nanomaterial is 5-60 nm.

5. The reinforced foam system according to claim 4, wherein the pH regulator is sodium carbonate, sodium bicarbonate or potassium carbonate; and
   the particle cosolvent is ethanol, ethylene glycol or isopropanol.

6. The reinforced foam system according to claim 1, wherein the foaming agent is a compounded system of one or more of *Camellia oleifera* saponin, alkyl glycoside, rhamnolipid, sophorolipid or trehalose lipid.

7. The reinforced foam system according to claim 6, wherein the 0-dimensional nanomaterial is a hydrophobic nanoparticle or a hydrophilic nanoparticle;
   a wetting angle of a surface of the hydrophobic nanoparticle to water is 102° to 137°;
   a wetting angle of a surface of the hydrophilic nanoparticle to water is 32° to 71°; and
   a particle size of the 0-dimensional nanomaterial is 5-60 nm.

8. The reinforced foam system according to claim 7, wherein the pH regulator is sodium carbonate, sodium bicarbonate or potassium carbonate; and
   the particle cosolvent is ethanol, ethylene glycol or isopropanol.

9. The reinforce foam system according to claim 1, wherein the nanocellulose is a compounded system of one or more of cellulose nanocrystals, cellulose nanofibers, or bacterial nanocellulose.

10. The reinforce foam system according to claim 1, wherein the nanocellulose is a compounded system of one or more of cellulose nanocrystals, cellulose nanofibers, or bacterial nanocellulose.

11. A preparation method of the reinforced foam system according to claim 1, comprising one of method A or method B:

method A:
adding the 1-dimensional nanomaterial into water and stirring, adding the foaming agent, and continuously stirring; then adding the 0-dimensional nanomaterial, the pH regulator and the particle cosolvent, and stirring to obtain a foam base solution;
pouring the foam base solution into a container, sealing the container, and introducing hydrogen to form a hydrogen environment in the container;
stirring the foam base solution by using Waring Blender method to foam, method B:
adding the 1-dimensional nanomaterial and the foaming agent into water and stirring, adding the 0-dimensional nanomaterial, the pH regulator and the particle cosolvent, and stirring to obtain a foam base solution;
injecting the foam base solution and hydrogen into a foam generator for mixing and foaming to obtain hydrogen foam with a foam quality required by operation, and directly injecting the hydrogen foam into a formation through a wellhead via a high-pressure pipeline for underground $H_2$ storage.

12. The preparation method according to claim 11, wherein the liquid phase comprises the following components in percentage by mass:
0.1-0.6% of the foaming agent;
0.5-2.5% of the foam stabilizer;
0.015-0.065% of the pH regulator;
0.5-2% of the particle cosolvent; and
water in balance.

* * * * *